United States Patent
Müeller et al.

(10) Patent No.: US 9,602,479 B2
(45) Date of Patent: Mar. 21, 2017

(54) ENCRYPTION BASED ON NETWORK INFORMATION

(75) Inventors: Thorsten Müeller, Unterschleissheim (DE); Stephan Eichler, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/345,035

(22) PCT Filed: Aug. 8, 2012

(86) PCT No.: PCT/EP2012/065496
§ 371 (c)(1),
(2), (4) Date: Jul. 9, 2014

(87) PCT Pub. No.: WO2013/037569
PCT Pub. Date: Mar. 21, 2013

(65) Prior Publication Data
US 2014/0344957 A1 Nov. 20, 2014

(30) Foreign Application Priority Data
Sep. 15, 2011 (DE) .................. 10 2011 082 741

(51) Int. Cl.
*H04L 29/06* (2006.01)
*H04L 9/08* (2006.01)
*H04L 9/06* (2006.01)

(52) U.S. Cl.
CPC ........ *H04L 63/0457* (2013.01); *H04L 9/0637* (2013.01); *H04L 9/088* (2013.01); *H04L 63/10* (2013.01)

(58) Field of Classification Search
CPC ..... H04L 63/10; H04L 63/0457; H04L 9/088; H04L 9/0637
See application file for complete search history.

(56) References Cited

U.S. PATENT DOCUMENTS

| 5,345,508 A | 9/1994 | Lynn et al. |
|---|---|---|
| 6,055,316 A | 4/2000 | Perlman et al. |
| 2003/0210681 A1* | 11/2003 | Sumi .................. H04L 1/22 370/352 |
| 2006/0126835 A1 | 6/2006 | Kim et al. |
| 2007/0133791 A1 | 6/2007 | Han et al. |
| 2008/0044012 A1* | 2/2008 | Ekberg et al. .......... 380/30 |

(Continued)

FOREIGN PATENT DOCUMENTS

| WO | 2007059558 A1 | 5/2007 |
|---|---|---|
| WO | 2011/044351 A2 | 4/2011 |

OTHER PUBLICATIONS

International Search Report issued in corresponding application No. PCT/EP2012/065496 mailed Dec. 18, 2012.

*Primary Examiner* — Robert Leung
(74) *Attorney, Agent, or Firm* — Carter, DeLuca, Farrell & Schmidt, LLP

(57) ABSTRACT

A communications device according to the present disclosure for communicating within a communications network contains an encryption device and an initialization-vector generator. The encryption device encrypts outgoing messages at least partially by means of a code and an initialization vector, which is generated by the initialization-vector generator. In this context, the initialization vector is generated at least partially on the basis of network information of the communications network.

12 Claims, 4 Drawing Sheets

(56) References Cited

U.S. PATENT DOCUMENTS

| | | |
|---|---|---|
| 2008/0287118 A1 | 11/2008 | Seppanen |
| 2010/0027783 A1 | 2/2010 | Yup |
| 2012/0191984 A1* | 7/2012 | Ohyama ............... H04L 9/0637 713/189 |
| 2013/0136256 A1* | 5/2013 | Relyea ................. H04L 9/0637 380/28 |

* cited by examiner

ENCRYPTION BASED ON NETWORK INFORMATION

BACKGROUND

Field

The invention relates to a communications device, a communications network and a communications method.

Description of Related Art

An encrypted exchange of data via a common medium such as the Internet without the need to grant unauthorised access to the data transmitted is of great importance (protection of confidentiality). Symmetrical encryption methods such as AES (Advanced Encryption Standard; German: fortschrittlicher Verschüsselungsstandard) are conventionally used for applications which require a high level of security. With symmetrical encryption methods, the encryption is implemented by means of a code, which is known only to the transmitter and the receiver, and by means of an initialisation vector, which is transmitted from the transmitter to the receiver together with encrypted data.

A device and a method in which a datastream is subdivided into individual blocks are known from DE 10 2008 013 785 A1, whereas the individual blocks are encrypted and whereas a common checksum is calculated over the individual, encrypted data blocks. A method known as the "Galois Counter Mode" (German: Galois Zählermodus) is used for this purpose.

The disadvantage with DE 10 2008 013 785 A1 is that the initialisation vectors used in that context are issued randomly. That is, it is possible for transmissions which are encrypted by means of an identical code also randomly to provide an identical initialisation vector. In particular, with transmissions at a fast data rate, in which a new random initialisation vector is formed frequently, it can occur that two packets with an identical code and an identical initialisation vector occur. Accordingly, it is possible to draw conclusions with regard to the information content of the unencrypted data without needing to implement a complete decryption. In particular, this can occur in practice in the case of large-scale communications networks which use a uniform code.

SUMMARY

The object of the invention is therefore to provide a communications device, a communications network and a method for communication which guarantee a very high security of the communication.

The object is achieved according to the invention for the communications device by the features of the independent claim 1, for the communications network by the features of the independent claim 8, for the method by the features of claim 9, for the computer program by the features of claim 16 and for the computer-software product by the features of claim 17. Advantageous further developments form the subject matter of the dependent claims referring back to these claims.

A communications device according to the invention for communicating within a communications network contains an encryption device and an initialisation-vector generator. The encryption device encrypts outgoing messages at least partially by means of a code and an initialisation vector, which is generated by the initialisation-vector generator. The initialisation vector is generated in this context at least partially on the basis of network information of the communications network. It is possible to achieve a demonstrable one-to-one correspondence of the initialisation vector in this manner.

BRIEF DESCRIPTION OF DRAWINGS

Various exemplary embodiments of the invention are described by way of example below with reference to the drawings. Identical subject matters provide the same reference numbers. The corresponding figures of the drawings show in detail.

DETAILED DESCRIPTION

Figure 1:
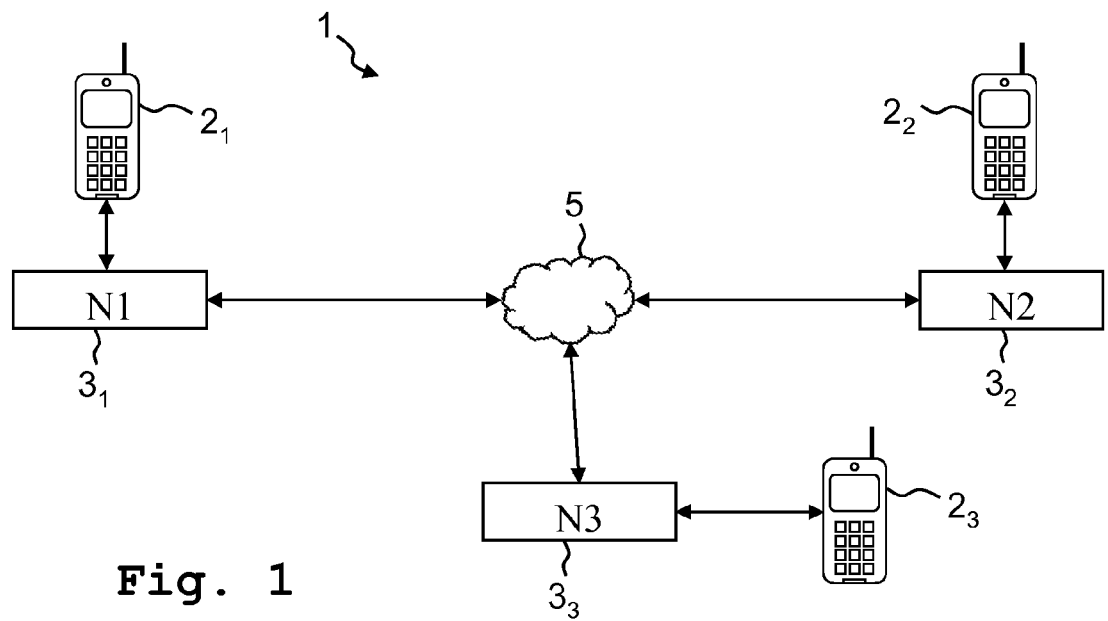
FIG. 1 an exemplary embodiment of a communications network according to the invention.

FIG. 1 describes an application for the communications network 1 according to the invention. Three communications devices $2_1$, $2_2$, $2_3$ according to the invention, which are shown in the exemplary embodiment from FIG. 1 as mobile telephones, exchange data packets 8 with one another in the presence of, for example, a voice link. In this exemplary embodiment, the data packets 8 to be exchanged are IP data packets (English: Internet Protocol; German: Internet Protokoll). The communications devices $2_1$, $2_2$, $2_3$ in this exemplary embodiment are connected to the partial network $3_1$ or respectively to the partial network $3_2$ or respectively to the partial network $3_3$. The partial networks $3_1$, $3_2$, $3_3$ are connected to one another through a radio transmission 5 via an air interface. Interference can often be superposed on such a radio transmission 5. A connection of the communications devices $2_1$, $2_2$, $2_3$ to the Internet at the connecting point of the partial networks $3_1$, $3_2$, $3_3$ is also possible.

Figure 2A:
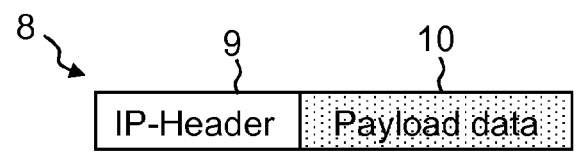
FIG. 2A an exemplary embodiment of a non-encrypted data packet.

FIG. 2A shows an exemplary embodiment of a data packet 8, which is exchanged between the communications devices $2_1$, $2_2$, $2_3$. The data packet 8 in this exemplary embodiment is an IP data packet. The data packet 8 provides a region in which an IP header 9 (English: IP header; German: IP-Kopf) is disposed, and a region in which the payload data 10 are disposed. If the data packet 8 from FIG. 2A is transmitted by the communications device $2_1$ to the communications device $2_2$, the information on the destination address in the partial network $3_2$, which can also be referred to as control data, is disposed, for example, in the IP header 9.

Figure 2B:
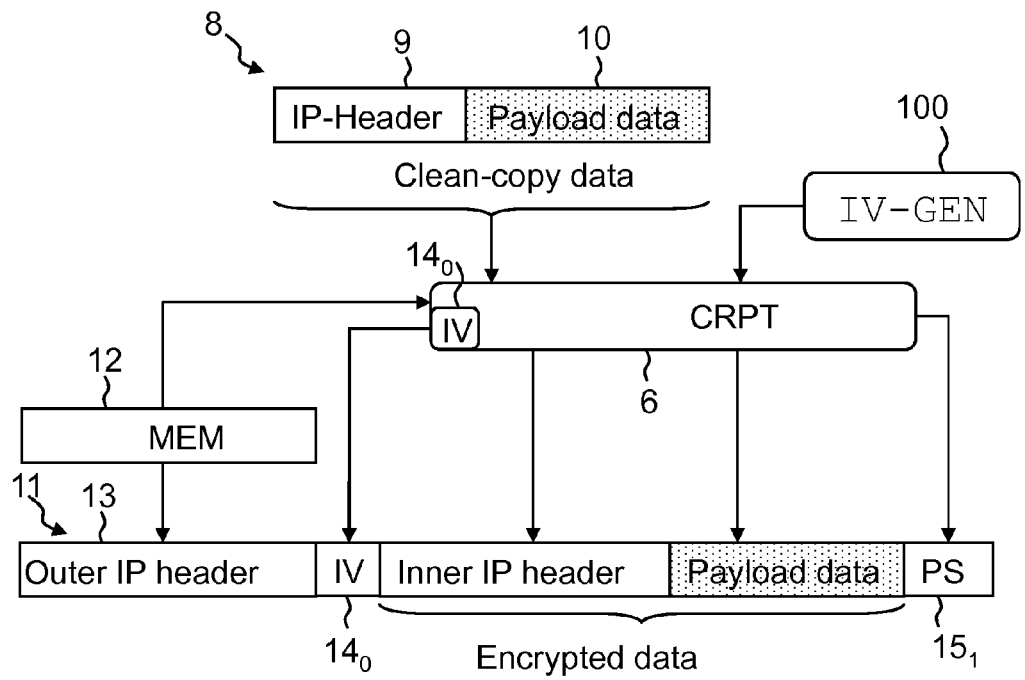
FIG. 2B an exemplary embodiment of how the data packet from FIG. 2A is further processed by the communications device according to the invention.

FIG. 2B shows the further processing of the data packet 8 by a communications device $2_1$, $2_2$, $2_3$ according to the invention with an integrated encryption unit 6. A data packet 8 transmitted by the communications device $2_1$ to the communications device $2_2$, which comprises a region with an IP header 9 and a region with the payload data 10, is transmitted to the encryption unit 6. The following section describes a new IP data packet 11 which can be transmitted via a common medium, such as the Internet, and transports the encrypted data packets 8 in its payload-data region.

For this purpose, the public IP address of the communications device $2_2$ is read from a storage unit 12. This IP address from the public address domain is entered as the destination address in an external IP header 13. The IP header 9 and the payload data 10 from the data packet 8 are encrypted by the encryption unit 6 and transmitted in the payload-data region of the IP data packet 11.

A sequence of network information, for example, the destination address, is supplied to an initialisation-vector generator 100. Alternatively or additionally, further network information can be used, as presented with reference to FIG. 4. From this, the initialisation-vector generator 100 generates a start value for an initialisation vector $14_0$. This is supplied to the encryption unit 6, which generates from it an initialisation vector $14_0$ for each encryption process. The encryption is implemented on the basis of the initialisation vector $14_0$. The generation of the initialisation vector will be described in greater detail on the basis of FIG. 4. As an alternative, the initialisation-vector generator 100 can also generate all of the initialisation vectors.

This initialisation vector $14_0$ is additionally added, at least partially, to the payload-data region of the IP data packet 11 and is not encrypted. Moreover, a checksum $15_1$, which is also not encrypted, is appended to the packet.

The communications device $2_2$ receives and decrypts the IP data packet 11 and guides the content, comprising the encrypted payload data and the initialisation vector $14_0$ to a decryption unit 7, which decrypts the encrypted data, so that they can then be further processed.

Figure 3:
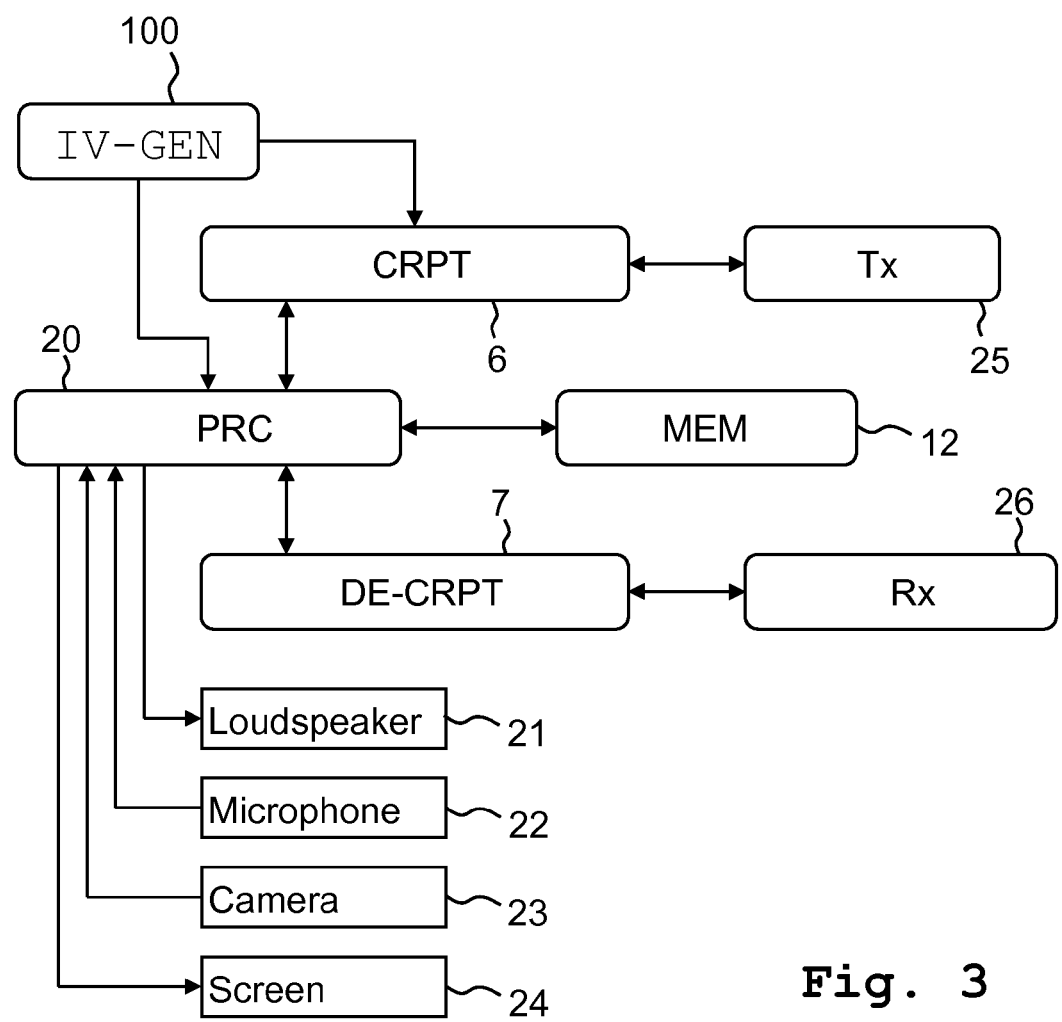
FIG. 3 an exemplary embodiment of the computer unit of the communications device according to the invention.

FIG. 3 shows an exemplary embodiment of a communications device with an integrated encryption unit 6 and an integrated decryption unit 7. The core of the communications device is a central data-processing unit 20. This central data processing unit 20 can be, for example, a signal processor or a programmable logic component. The central data-processing unit 20 is connected to the encryption unit 6 and also to the decryption unit 7. The storage unit 12 is also connected to the central processing unit 20. The encryption unit 6 is further connected to an initialisation-vector generator 100, which, for its part, is connected to the data-processing unit 20.

In the exemplary embodiment according to the invention from FIG. 3, a loudspeaker 21, a microphone 22, a camera system 23 and a screen unit 24 are additionally connected to the central data-processing unit 20. However, it is not necessary for precisely these systems or for all four systems 21, 22, 23, 24 to be connected to the central data-processing unit 20. Only one or more of these systems 21, 22, 23, 24 may also be connected to the central data-processing unit 20. The central data-processing unit 20 receives a datastream from the at least one microphone 22 or the at least one camera system 23 and optionally encodes this before the datastream is rerouted to the encryption unit 6. With the use of a start value of an initialisation vector $14_0$, which is provided by the initialisation-vector generator 100, the latter encrypts the datastream. For this purpose, the initialisation-vector generator 100 uses information which relates to the communications network, which it receives from the data-processing unit 20. The generation of this start value will be described in greater detail with reference to FIG. 4. At the other end, the central data-processing unit 20 receives a datastream from the decryption unit 7 and optionally decodes the latter before it is rerouted to the at least one loudspeaker 21 or headphones or to the at least one screen unit 24.

In the exemplary embodiment from FIG. 3, the encryption unit 6 is connected to the transmitter unit 25. The decryption unit 7 in the exemplary embodiment from FIG. 3 is connected to the receiver unit 26. According to the exemplary embodiment from FIG. 1, the transmitter unit 25 and the receiver unit 26 can alternatively also be a wire-bound transmission path, for example, a network connection. However, it is also possible for the transmitter unit 25 and the receiver unit 26 to be a communications unit which allows wireless data transmission. In this case, the transmitter unit 25 contains the necessary conditioning and amplification units, whereas the receiver unit 26 contains the appropriate mixer arrangements for receiving a datastream transmitted through the air in the frequency bands possible for this purpose, such as HF (English: high-frequency; German: Hochfrequenz), VHF (English: very high-frequency; German: Ultrakurzwelle) or UHF (English: Ultra high-frequency; German: Dezimeterwelle) and devices for digitising the baseband signal. Transmission errors can then occur, for example, as a result of a poor transmission channel.

Figure 4:
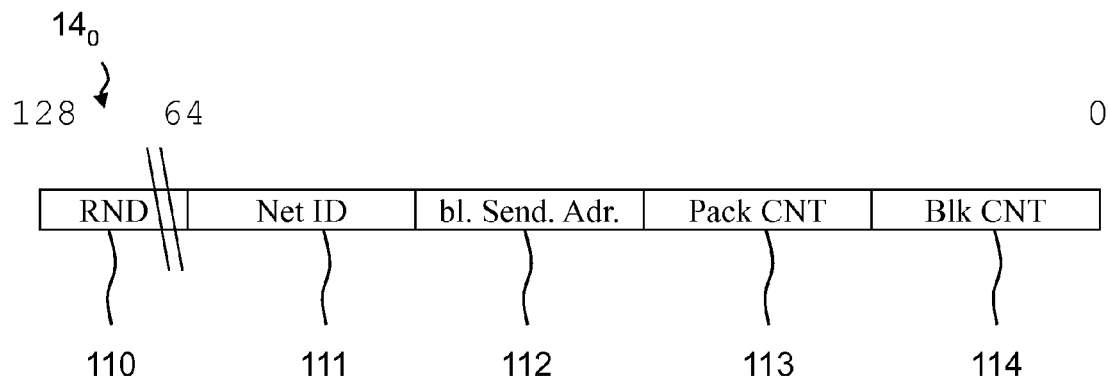
FIG. 4 an exemplary embodiment of an initialisation vector in a communications device according to the invention.

FIG. 4 shows the structure of an initialisation vector $14_0$, such as is generated by the communications device according to the invention. In this context, the initialisation vector $14_0$ provides a length of, for example, 128 bits. The upper, for example, 64 bits, between bit 64 and bit 128, are formed by a random portion 110. This portion 110 is generated by means of a random generator, which generates random numbers in a largely uniformly distributed manner. The remaining, for example, 64 bits of the initialisation vector $14_0$ are formed by information relating to the communications network. This is composed of a network-identification number 111, a transmitter address 112, a packet number 113 and a block number 114. This network-identification number 111 is unique for the communications network or for partial networks $3_1$, $3_2$, $3_3$ of the communications network 1.

The packet number 113 corresponds to the number of the packet just transmitted. The block number 114 corresponds to the number of the block just transmitted. However, a use of different information is also possible. It is also possible to omit individual items of the information presented here. Through the combination of the random component 110 with at least one parameter of the communications network, an unambiguous assignment of the initialisation vector $14_0$ is achieved. In this context, the initialisation-vector generator 100 from FIG. 2B and FIG. 3 advantageously generates only a start value of the initialisation vector $14_0$. The counting of the packet numbers 113 and the block numbers 114 is implemented by the encryption unit 6.

As explained with reference to FIG. 2B, the initialisation vector $14_0$ is transmitted unencrypted as a part of the transmitted packet. Alternatively, only an excerpt from the initialisation vector may be transmitted. In this manner, only that part of the initialisation vector $14_0$ which is not already known to the receiver is transmitted. For example, if the transmitter and receiver are disposed in an identical communications network, it is not necessary to transmit the network identification number 111. If a preceding packet or a preceding block has already been transmitted to the receiver, it is not necessary also to transmit the packet number 113 or respectively the block number 114. Moreover, these parameters can be incremented at the receiver end. The time required for the transmission can be reduced in this manner.

Figure 5:
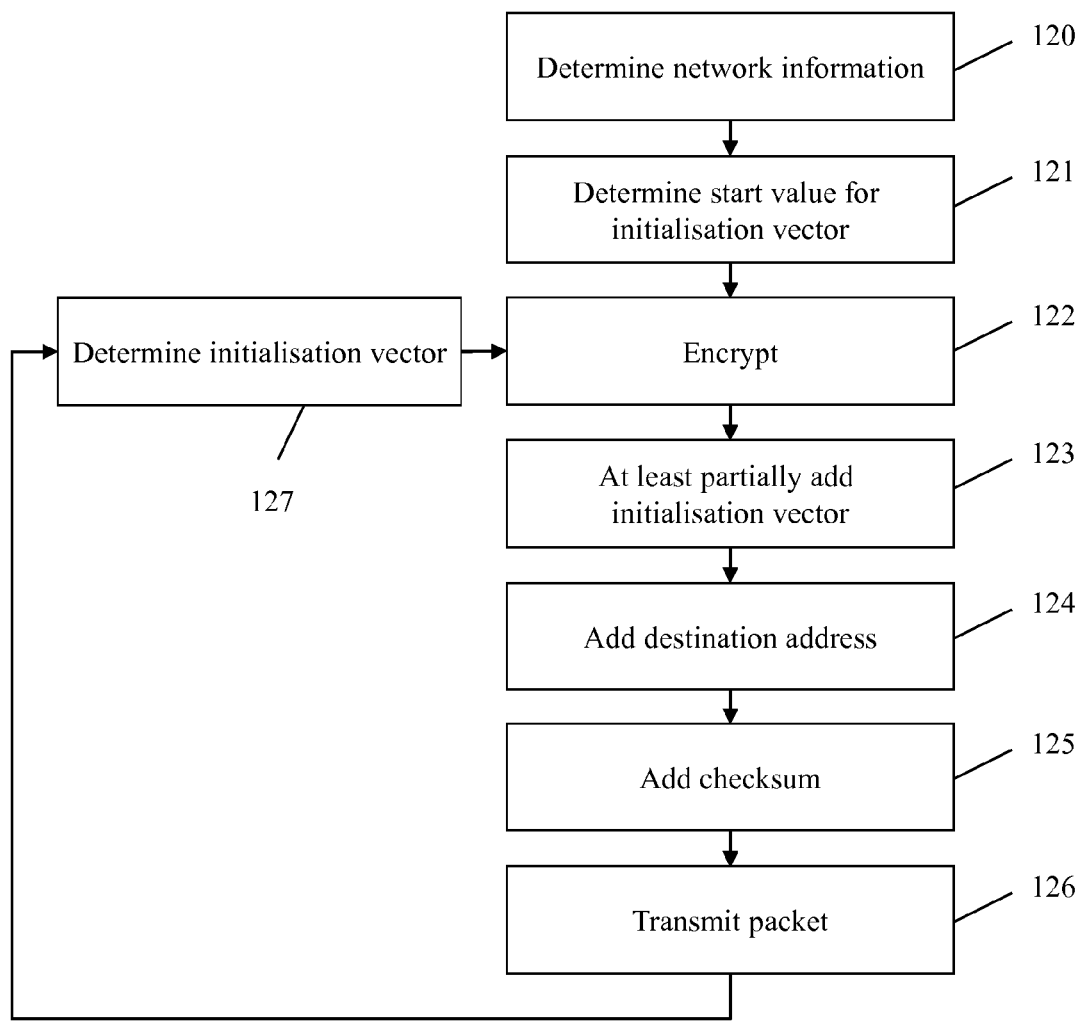
FIG. 5 an exemplary embodiment of the communications method according to the invention in a flow chart.

FIG. 5 shows an exemplary embodiment of the communications method according to the invention in a flow chart. In a first step 120, information relating to the communications network is determined. This includes, for example, a network-identification number, a transmitter address, a block number or a packet number. In a second step 121, a start value of the initialisation vector is determined on the basis of this network information. For this purpose, the network information is combined with a random component. In a third step 122, payload data to be transmitted are encrypted by means of a code and the start value of the initialisation vector.

Following this, in a fourth step 123, at least a part of the initialisation vector is added unencrypted to the encrypted data. In this context, either the entire initialisation vector can be added or only a part of the initialisation vector not known to the receiver of the packet. Parts of the initialisation vector which are known to the receiver or can be calculated by the latter need not be transmitted in the packet.

In a fifth step 124, the destination address of the encrypted data is added to the packet unencrypted. In a sixth step 125, a checksum is also added. In a seventh step 126, the encrypted packet is finally transmitted.

In an optional eighth step 127, a new initialisation vector is determined on the basis of the start value of the initialisation vector from the second step 121. This is implemented by incrementing various counters. In this manner, part of the initialisation vector can be a packet counter or a block counter. These are incremented in this step. Accordingly, the further steps 122-126 are repeated with the new initialisation vector. By determining further, new initialisation vectors, the steps 122-127 can be run through as often as required. This ensures that an initialisation vector is used only a single time in the entire communications network.

The method according to the invention is particularly suitable for implementation within a program which is executed on a computer or a digital signal processor or other electronic computer units. The method is also particularly suitable for storage on a machine-readable carrier as program code, so that the program can be subsequently executed on a computer or a digital signal processor or other electronic computer units. The invention is not restricted to the exemplary embodiment presented. Within the scope of the invention, all of the features described and/or illustrated can be advantageously combined with one another.

The invention claimed is:

1. A communications device for communicating within a communications network, comprising:
    an initialisation-vector generator that generates, for each of a plurality of outgoing messages, a respective initialisation vector based at least in part on a respective random component, a transmitter address of the communications device, a packet number, and a block number, wherein the packet number is distinct from the block number; and
    an encryption device that encrypts each of the plurality of outgoing messages based at least in part on a code and the respective initialisation vector.

2. The communications device according to claim 1, wherein, in the case of a communications process, the initialisation-vector generator generates a first value of the respective initialisation vector as a start value, and
    wherein the encryption device generates further initialisation vectors for the further encryption of the communications process on a basis of the start value.

3. The communications device according to claim 1, wherein each of the plurality of outgoing messages contains:
    payload data, which is encrypted with the code and the respective initialisation vector, and
    at least a portion of the respective initialization vector in an unencrypted form.

4. The communications device according to claim 1, wherein the plurality of outgoing messages do not contain, in an unencrypted form, any parts of the respective initialisation vector which are already known to an anticipated receiver.

5. The communications device according to claim 1, wherein the initialisation-vector generator generates the respective initialisation vector in such a manner that it is unique within the communications network.

6. A communications network comprising a plurality of communications devices, each of the plurality of communications devices comprising:
    an initialisation-vector generator that generates, for each of a plurality of outgoing messages, a respective initialisation vector based at least in part on a respective random component, a transmitter address of the respective communication device, a packet number, and a block number, wherein the packet number is distinct from the block number; and
    an encryption device which encrypts each of the plurality of outgoing messages based at least in part on a code and the respective initialisation vector.

7. A communications method for a communications device communicating within a communications network, comprising:
    generating, for each of a plurality of outgoing messages, a respective random component;
    generating, for each of the plurality of outgoing messages, an initialisation vector based at least in part on the respective random component, a transmitter address of the communications device, a packet number, and a block number, wherein the packet number is distinct from the block number; and
    encrypting the plurality of outgoing messages based at least in part on a code and the respective initialisation vector.

8. The communications method according to claim 7, wherein, in the case of a communications process, a first value of the respective initialisation vector is generated as a start value, and
    wherein further initialisation vectors are generated on a basis of the start value for further encryption of the communications process.

9. The communications method according to claim 7, wherein each of the plurality of outgoing messages contains:
    payload data, which is encrypted with the code and the respective initialisation vector, and
    at least a portion of the respective initialization vector in an unencrypted form.

10. The communications method according to claim 7, wherein the plurality of outgoing messages do not contain, in an unencrypted form, any parts of the respective initialisation vector which are already known to an anticipated receiver.

11. The communications method according to claim 7, wherein the respective initialisation vector is generated in such a manner that it is unique within the communications network.

12. A non-transitory computer-readable medium having stored thereon sequences of instructions, which, when executed by a processor, implement a communications method for communicating within a communications network, the communications method comprising:
    generating, for each of a plurality of outgoing messages of a communications device, a respective initialisation vector based at least in part on a respective random component, a transmitter address of the communications device, a packet number, and a block number, wherein the packet number is distinct from the block number; and encrypting each of the plurality of outgoing messages based at least in part on a code and the respective initialisation vector.

* * * * *